US012591238B2

(12) United States Patent
Akatsuka

(10) Patent No.: US 12,591,238 B2
(45) Date of Patent: Mar. 31, 2026

(54) INDUSTRIAL VEHICLE THAT MAINTAINS OBJECT AVOIDANCE CONTROL WHEN THE FIRST TRAVEL MODE IS SWITCHED TO THE SECOND TRAVEL MODE

(71) Applicant: KABUSHIKI KAISHA TOYOTA JIDOSHOKKI, Kariya (JP)

(72) Inventor: Keisuke Akatsuka, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 193 days.

(21) Appl. No.: 18/502,627

(22) Filed: Nov. 6, 2023

(65) Prior Publication Data

US 2024/0152149 A1     May 9, 2024

(30) Foreign Application Priority Data

Nov. 9, 2022    (JP) ................................. 2022-179590

(51) Int. Cl.
*G05D 1/00*          (2006.01)
*B66F 9/06*          (2006.01)

(52) U.S. Cl.
CPC ........... *G05D 1/0214* (2013.01); *B66F 9/063* (2013.01); *G05D 1/0223* (2013.01)

(58) Field of Classification Search
CPC ...... G05D 1/0214; G05D 1/0223; B66F 9/063
See application file for complete search history.

(56) References Cited

U.S. PATENT DOCUMENTS

2003/0013575 A1* 1/2003 Sprinkle ................ B60K 31/04
                                                        477/120
2010/0196096 A1* 8/2010 Halonen ............... E01C 19/405
                                                        404/84.1

(Continued)

FOREIGN PATENT DOCUMENTS

AU        2009322218 A1     6/2010
EP       4 071 102 A1     10/2022

(Continued)

OTHER PUBLICATIONS

English translation of JP-2021093124-A (Year: 2021).*

(Continued)

*Primary Examiner* — Navid Z. Mehdizadeh
*Assistant Examiner* — Matthew Ho
(74) *Attorney, Agent, or Firm* — Sughrue Mion, PLLC

(57)                ABSTRACT

An industrial vehicle includes an industrial vehicle including an object detector, a switching member configured to perform switching between a first travel mode in which the industrial vehicle travels in a direction toward a detection range of the object detector and a second travel mode in which the industrial vehicle does not travel in the direction toward the detection range of the object detector, and a controller configured to perform an object avoidance control according to a detection result of the object detector. The controller performs the object avoidance control according to the detection result of the object detector when the first travel mode is set. The controller performs a control so as to maintain the object avoidance control when the first travel mode is switched to the second travel mode while the industrial vehicle is travelling in the first travel mode.

4 Claims, 5 Drawing Sheets

(56) References Cited

U.S. PATENT DOCUMENTS

2014/0316633 A1 * 10/2014 Tsujimoto ............ G05D 1/0261
                                                                701/23
2022/0411246 A1    12/2022 Kubotani et al.
2023/0229178 A1     7/2023 Kubotani et al.

FOREIGN PATENT DOCUMENTS

EP          4067290 A1 * 10/2022
JP          2021093124 A  * 6/2021  ........ B60W 30/0953
KR    10-2015-0105930 A     9/2015
WO          2022/050036 A1    3/2022

OTHER PUBLICATIONS

Extended European Search Report issued Apr. 9, 2024 in European Application No. 23208159.6.
Office Action issued Feb. 14, 2025 in Canadian Patent Application No. 2021-015898.
Communication dated Jun. 23, 2025 in Australian Application No. 2023254917.
Communication dated Jan. 3, 2026 in Korean Application No. 10-2023-0149779.

* cited by examiner

FIG. 4
FIG. 5
FIG. 6
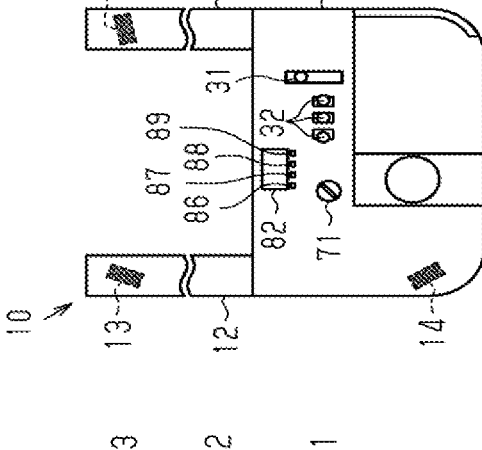
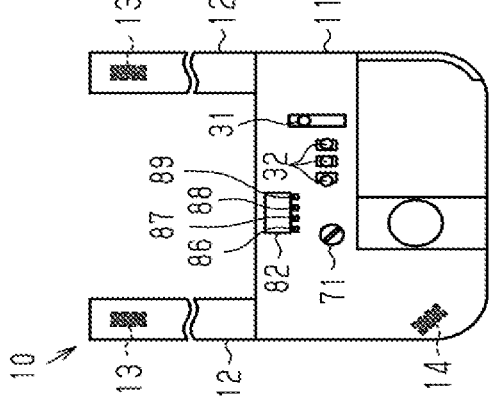

INDUSTRIAL VEHICLE THAT MAINTAINS OBJECT AVOIDANCE CONTROL WHEN THE FIRST TRAVEL MODE IS SWITCHED TO THE SECOND TRAVEL MODE

CROSS-REFERENCE TO RELATED APPLICATION

This application claims priority to Japanese Patent Application No. 2022-179590 filed on Nov. 9, 2022, the entire disclosure of which is incorporated herein by reference.

BACKGROUND ART

The present disclosure relates to an industrial vehicle.

An industrial vehicle disclosed in Japanese Patent Application Publication No. 2021-93124 includes an object detector, a controller, and an alert device. The object detector detects a position of an object relative to the industrial vehicle. The controller performs a vehicle speed limit according to a detection result of the object detector. The controller causes the alert device to issue an alert according to the detection result of the object detector.

In some models of industrial vehicles, for example, all wheels are steerable, and such a model has a plurality of travel modes. In this case, depending on the travel modes, the detection result of the object detector and the moving direction of the industrial vehicle may not match. If the vehicle speed limit is performed according to the detection result of the object detector, the work efficiency may be decreased. Similarly, depending on the travel modes, if an alert is issued by the alert device according to the detection result of the object detection unit, the work efficiency may be decreased. In order to suppress the decrease in the work efficiency, the vehicle speed limit and the alert may be disabled for some of the travel modes. However, if the travel mode transitions to a travel mode in which the vehicle speed limit and the alert are disabled while the industrial vehicle travels with the vehicle speed limit performed, for example, the vehicle speed limit is disabled, and the industrial vehicle travels according to an operation of an accelerator. Therefore, there has been a demand to suppress the decrease in the work efficiency as well as to perform the vehicle speed limit and the alert based on the detection result of the object by the object detector.

SUMMARY

In accordance with an aspect of the present disclosure, there is provided an industrial vehicle including an object detector, a switching member configured to perform switching between a first travel mode in which the industrial vehicle travels in a direction toward a detection range of the object detector and a second travel mode in which the industrial vehicle does not travel in the direction toward the detection range of the object detector, and a controller configured to perform an object avoidance control according to a detection result of the object detector. The controller performs the object avoidance control according to the detection result of the object detector when the first travel mode is set. The controller performs a control that maintains the object avoidance control when the first travel mode is switched to the second travel mode while the industrial vehicle is travelling in the first travel mode.

BRIEF DESCRIPTION OF THE DRAWINGS

The disclosure, together with objects and advantages thereof, may best be understood by reference to the following description of the embodiments together with the accompanying drawings in which:

FIG. 4 is a view illustrating directions of front wheels and a rear wheel when a travel mode of the industrial vehicle of FIG. 1 is a normal mode;

FIG. 5 is a view illustrating the directions of the front wheels and the rear wheel when the travel mode of the industrial vehicle of FIG. 1 is a right-angle and sharp turning mode;

FIG. 6 is a view illustrating the directions of the front wheels and the rear wheel when the travel mode of the industrial vehicle of FIG. 1 is a pivot turning mode;

DETAILED DESCRIPTION OF THE EMBODIMENTS

First Embodiment

The following will describe a first embodiment of an industrial vehicle.

Industrial Vehicle

Figure 1:
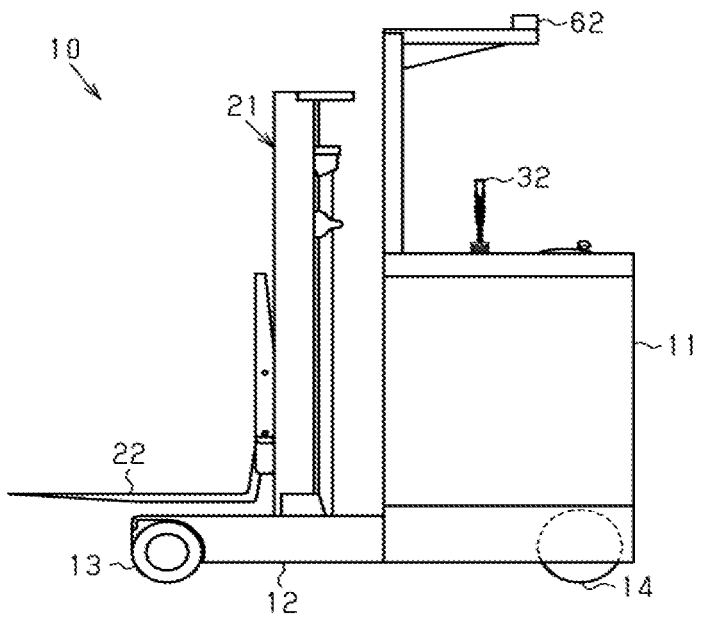
FIG. 1 is a side view of an industrial vehicle.

As illustrated in FIG. 1, an industrial vehicle 10 is a reach-type forklift truck. The industrial vehicle 10 is manually operated. The industrial vehicle 10 may be configured to be switchable between an autonomous operation and a manual operation. In the following description, the front, rear, left, and right indicate directions relative to the industrial vehicle 10.

The industrial vehicle 10 includes a vehicle body 11. The industrial vehicle includes two reach legs 12. The two reach legs 12 are spaced from each other in a left-right direction. The reach legs 12 extend forward from the vehicle body 11.

The industrial vehicle 10 includes front wheels 13. One front wheel 13 is provided for each of the reach legs 12. The industrial vehicle 10 includes a rear wheel 14. The rear wheel 14 is provided in the vehicle body 11.

The industrial vehicle 10 includes a material handling device 21. The material handling device 21 is provided in a front part of the vehicle body 11. The material handling device 21 includes a fork 22.

Figure 2:
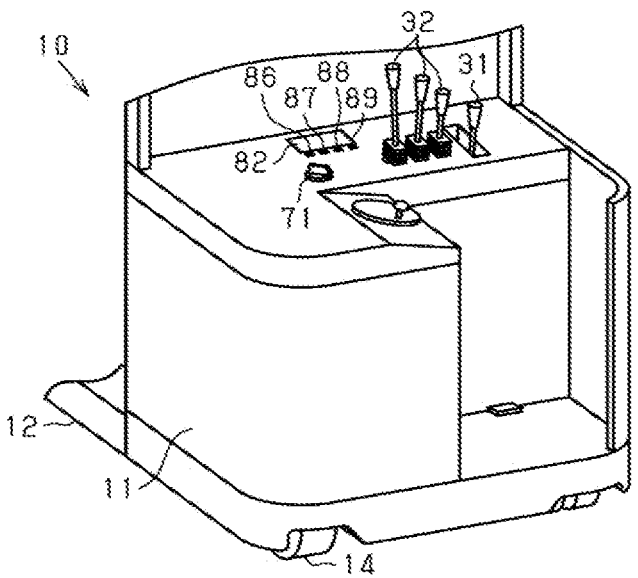
FIG. 2 is a perspective view illustrating a part of the industrial vehicle of FIG. 1.

As illustrated in FIG. 2, the industrial vehicle 10 includes a direction operating member 31. The direction operating member 31 is a lever, for example. The direction operating member 31 is tiltable forward or rearward from a neutral position. The direction operating member 31 is operated to cause the industrial vehicle 10 to travel. A moving direction of the industrial vehicle 10 is determined by an operation direction of the direction operating member 31. A vehicle speed of the industrial vehicle 10 may be adjusted by an operation amount of the direction operating member 31.

The industrial vehicle 10 includes a plurality of material handling operation members 32. The material handling operation members 32 each are a lever, for example. The material handling operation members 32 are operated to operate the material handling device 21. The material handling operation members 32 are provided so as to correspond to operations of the material handling device 21. In the present embodiment, three material handling operation members 32 are provided corresponding to a reach operation, a lift operation, and a tilt operation. The reach operation is an operation to move the fork 22 forward and rearward. The lift operation is an operation to move the fork 22 up and down. The tilt operation is an operation to tilt the fork 22 forward and rearward.

Figure 3:
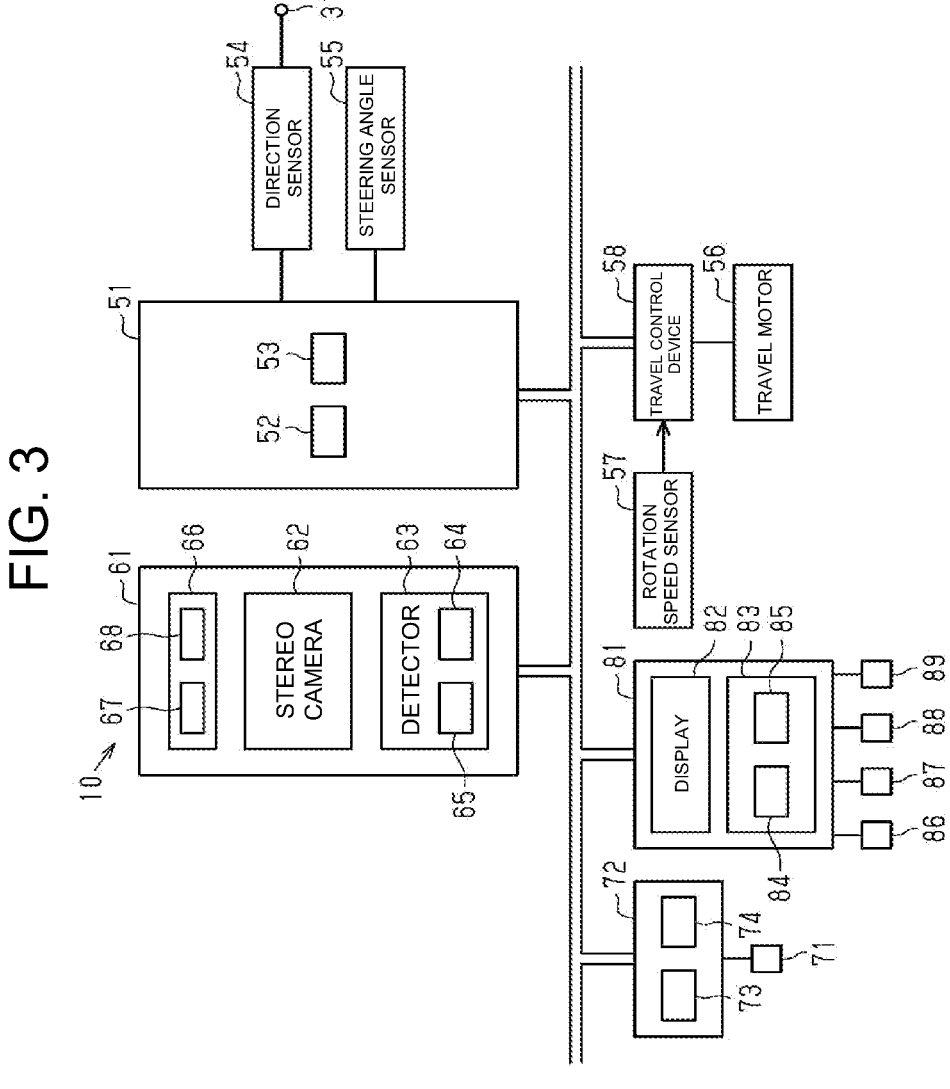
FIG. 3 is a schematic configuration view of an industrial vehicle of FIG. 1.

As illustrated in FIG. 3, the industrial vehicle 10 includes a first control device 51. The first control device 51 includes a processor 52 and a memory 53. For the processor 52, a CPU (Central Processing Unit), a GPU (Graphics Processing Unit), a DSP (Digital Signal Processor), or the like is used. The memory 53 includes a RAM (Random Access Memory) and a ROM (Read Only Memory). The memory 53 stores various programs for operating the industrial vehicle 10. The memory 53 stores program codes or commands configured to cause the processor 52 to execute processes. The memory 53, that is, a computer readable medium, includes any available medium that is accessible by a general-purpose computer or a dedicated computer. The first control device 51 may include a hardware circuit such as an ASIC (Application Specific Integrated Circuit) or an FPGA (Field Programmable Gate Array). The first control device 51, which is a processing circuit, may include one or more processors that operates in accordance with computer programs, one or more hardware circuits such as the ASIC or the FPGA, or a combination thereof. The first control device 51 corresponds to a controller.

The industrial vehicle 10 includes a direction sensor 54. The direction sensor 54 detects an operation amount of the direction operating member 31. The direction sensor 54 outputs an electric signal corresponding to the operation amount of the direction operating member 31 to the first control device 51. The first control device 51 recognizes the operation direction of the direction operating member 31 and the operation amount of the direction operating member 31.

The industrial vehicle 10 includes a steering angle sensor 55. The steering angle sensor 55 detects a steering angle of the rear wheel 14. The steering angle sensor 55 outputs an electric signal corresponding to the steering angle to the first control device 51. The first control device 51 recognizes the steering angle of the rear wheel 14.

The industrial vehicle 10 includes a travel motor 56. The travel motor 56 drives the industrial vehicle 10. Driving of the travel motor 56 rotates the rear wheel 14, thereby causing the industrial vehicle 10 to travel.

A rotational speed sensor 57 detects a rotational speed of the travel motor 56. As the rotational speed sensor 57, for example, a rotary encoder may be used. The rotational speed sensor 57 outputs an electric signal corresponding to the rotational speed of the travel motor 56.

A travel control device 58 is a motor driver that controls the rotational speed of the travel motor 56. The travel control device 58 can recognize the rotational speed and the rotational direction of the travel motor 56 from the electric signal output from the rotational speed sensor 57.

The industrial vehicle 10 includes an object detector 61. The object detector 61 detects a position of an object. The object detector 61 includes a stereo camera 62, a detector 63, and an alert device 66. The stereo camera 62 includes two cameras, and captures an image by the two cameras. The stereo camera 62 of the present embodiment captures an image of an area behind the industrial vehicle 10. Thus, an object detected by the object detector 61 is an object existing behind the industrial vehicle 10. A detection range of the object detector 61 expands rearward.

The detector 63 includes a hardware configuration similar to the first control device 51, for example. The detector 63 includes a processor 64, and a memory 65. The detector 63 obtains image data from the stereo camera 62. The detector 63 detects an object existing in the detection range from the image data. The detector 63 calculates coordinates of the object indicating a position of the object relative to the industrial vehicle 10 in the coordinate system. The detection range is determined by the angle of view of the stereo camera 62. The width of the detection range in the horizontal direction is, for example, 130 degrees with respect to the left-right direction.

The alert device 66 issues an alert to an operator of the industrial vehicle 10. The alert device 66 includes a buzzer 67 that issues an alert with sound, and a lamp 68 that issues an alert with light.

The industrial vehicle 10 includes a switching device 71. The switching device 71 is disposed at a position where the switching device 71 is operable from the operator of the industrial vehicle 10. The switching device 71 is a switch switchable between two positions. The switching device 71 is a switch for switching travel modes of the industrial vehicle 10. The travel modes include a normal mode and all-way modes. The normal mode is a travel mode used in a normal situation. The normal mode is expected to be used most frequently. The all-way modes each are a travel mode that is used in a specific situation. The all-way modes include a right-angle and sharp turning mode, a pivot turning mode, a lateral travel mode, and a parallel travel mode.

The industrial vehicle 10 includes a second control device 72. The second control device 72 includes a hardware configuration similar to the first control device 51, for example. The second control device 72 includes a processor 73 and a memory 74, for example. The second control device 72 can recognize an operation state of the switching device 71. The second control device 72 recognizes whether the normal mode or the all-way modes are selected for the travel mode from the operation of the switching device 71.

The industrial vehicle 10 includes a display unit 81. The display unit 81 includes a display 82, a display control device 83, and a plurality of selection switches 86, 87, 88, 89.

The display 82 is disposed at a position where the display 82 is visible from the operator of the industrial vehicle 10. The display 82 is, for example, a liquid crystal display or an organic electro-luminescence display.

The selection switches 86, 87, 88, 89 are disposed at positions where the selection switches 86, 87, 88, 89 are operable from the operator of the industrial vehicle 10. The selection switches 86, 87, 88, 89 are switches that are pushed down by the operator of the industrial vehicle 10. The selection switches 86, 87, 88, 89 may be levers or handles. If the display 82 is a touch panel, the selection switches 86, 87, 88, 89 may be symbols shown on the display 82. The selection switches 86, 87, 88, 89 are switches for selecting one mode from a plurality of all-way modes. The number of the selection switches 86, 87, 88, 89 corresponds to the number of the all-way modes. In the present embodiment, the display unit 81 is provided with the selection switch 86 corresponding to the right-angle and sharp pivot turning mode, the selection switch 87 corresponding to the pivot turning mode, the selection switch 88 corresponding to the lateral travel mode, and the selection switch 89 corresponding to the parallel travel mode.

The display control device 83 includes a hardware configuration similar to the first control device 51, for example. The display control device 83 includes a processor 84, and a memory 85. The display control device 83 controls the display unit 81. For example, the display control device 83 updates contents shown on the display 82. The display control device 83 can recognize which one of the all-way modes is selected from states of the selection switches 86, 87, 88, 89.

The first control device 51, the detector 63, the second control device 72, and the display control device 83 obtain information from each other by communication in accordance with a vehicle communication protocol. For example, CAN (Controller Area Network), or LIN (Local Interconnect Network) may be used as the vehicle communication protocol.

The second control device 72 sets a travel mode. The second control device 72 sets the travel mode based on the input from the switching device 71, and the states of the selection switches 86, 87, 88, 89 obtained from the display control device 83. The second control device 72 selects the normal mode for the travel mode when the normal mode is selected by the switching device 71. The second control device 72 sets one of the all-way modes selected by the selection switches 86, 87, 88, 89 when the all-way modes are selected by the switching device 71. A default setting for the all-way modes when the switching device 71 switches from the normal mode to the all-way modes may be set from any one of the all-way modes. For example, the pivot turning mode may be set as a default setting for the all-way modes when the switching device 71 switches from the normal mode to the all-way modes. The switching device 71 and the selection switches 86, 87, 88, 89 correspond to a switching member.

As illustrated in FIG. 4, the normal mode is a travel mode in which only the rear wheel 14 is steered as a steered wheel. In the normal mode, the front wheels 13 are oriented in the front-rear direction when the industrial vehicle 10 travels straight. The detection range of the object detector 61 expands rearward, and the industrial vehicle 10 can travel rearward in the normal mode. The normal mode corresponds to a first travel mode that allows the industrial vehicle 1 to travel in a direction including the detection range of the object detector 61. The direction including the detection range of the object detector 61 is a direction within the detection range, or, in other words, a direction which overlaps the detection range. For example, when a direction from the object detector 61 to the rear of the industrial vehicle 10 is zero degrees, the detection range is a range extending from zero degrees to the left and the right by 65 degrees. In this case, directions from zero degrees to 65 degrees to the left and the right are defined as the directions including the detection range. Directions different from 0 degrees to 65 degrees to the left and right are those that do not include the detection range.

As illustrated in FIG. 5, the right-angle and sharp turning mode is a travel mode in which the two front wheels 13 and the rear wheel 14 are steered as the steered wheels. The right-angle and sharp turning mode is one of the travel modes that is used when turning a place where it is difficult to turn such as a right-angle corner. The center of rotation is closer to the industrial vehicle 10 in the right-angle and sharp turning mode than that in the normal mode. The right-angle and sharp turning mode corresponds to a first travel mode in which the industrial vehicle 10 is movable to a direction including the detection range of the object detector 61.

As illustrated in FIG. 6, the pivot turning mode is a travel mode in which the two front wheels 13 and the rear wheel 14 are steered as the steered wheels. In the pivot turning mode, the industrial vehicle 10 turns on the spot with the center of the rotation at the center of the industrial vehicle 10. The pivot turning mode corresponds to a first travel mode in which the industrial vehicle 10 is movable to the direction toward the detection range of the object detector 61.

Figure 7:
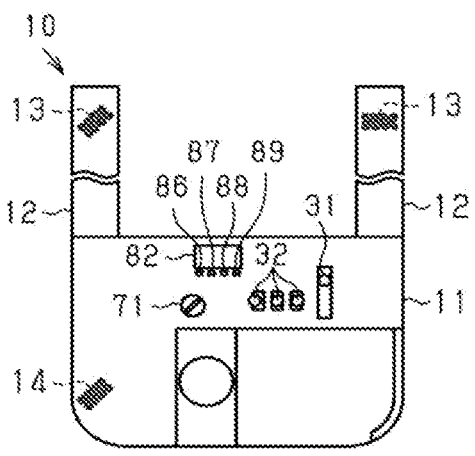
FIG. 7 is a view illustrating the directions of the front wheels and the rear wheel when the travel mode of the industrial vehicle of FIG. 1 is a lateral travel mode.

As illustrated in FIG. 7, the lateral travel mode is a travel mode in which one of the front wheels 13 and the rear wheel 14 are steered as the steered wheels. The lateral travel mode is a travel mode in which traveling direction is in the left-right direction. In the lateral travel mode, the front wheels 13 are oriented in the left-right rear direction while the industrial vehicle 10 is travelling straight. When the industrial vehicle 10 travels in the lateral travel mode, the travel direction is the left-right direction, so that the front-rear direction is a blind spot. The lateral travel mode corresponds to a second travel mode in which the industrial vehicle 10 does not travel in a direction including the detection range of the object detector 61.

Figure 8:
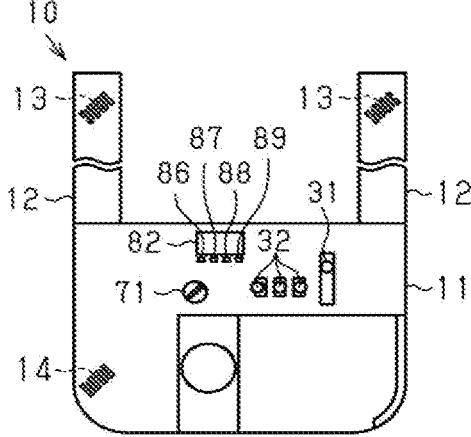
FIG. 8 is a view illustrating the directions of the front wheels and the rear wheel when the travel mode of the industrial vehicle of FIG. 1 is a parallel travel mode.

As illustrated in FIG. 8, the parallel travel mode is a travel mode in which the two front wheels 13 and the rear wheel 14 are steered as the steered wheels. In the parallel travel mode, the industrial vehicle 10 travels without changing the orientation of the vehicle body 11. In the parallel travel mode, the two front wheels 13 and the rear wheel 14 are oriented in the same direction. When the industrial vehicle 10 travels in the parallel travel mode, the industrial vehicle 10 is operated such that the travel direction becomes the left-right direction. The parallel travel mode corresponds to a second travel mode in which the industrial vehicle 10 does not travel in the direction including the detection range of the object detector 61.

Although, in the present embodiment, the first travel mode and the second travel mode are assigned to the travel modes, the assigned travel modes may be changed depending on the detection range of the object detector 61.

The industrial vehicle 10 includes an object detection function. The object detection function is a function that performs a vehicle speed limit, an alert, or both of them according to the detection result of an object by the object detector 61. The first control device 51 performs the vehicle speed limit depending on a position of the object. For example, the first control device 51 performs the vehicle speed limit by setting an upper speed limit when an object exists in a predetermined range from the industrial vehicle 10. In other words, the first control device 51 is configured to perform an object avoidance control in which the upper speed limit is set according to the detection result of the object detector 61. The predetermined range may be set for any desired range. The predetermined range may change depending on the vehicle speed of the industrial vehicle 10. For example, the predetermined range becomes wider as the vehicle speed of the industrial vehicle increases. The predetermined range may change depending on the steering angle. For example, the predetermined range is set in a direction extending in the steering angle. The first control device 51 performs the vehicle speed limit by performing a control so that the vehicle speed of the industrial vehicle 10 does not exceed the upper speed limit. The upper speed limit may be a fixed value, or a variable value that changes depending on the positional relationship between the industrial vehicle 10 and the object. For example, the upper speed limit may be set lower as a distance between the industrial vehicle 10 and the object becomes shorter.

The first control device 51 causes the alert device 66 to issue an alert depending on a position of the object. The first control device 51 transmits an alert command to the object detector 61 to allow the alert device 66 to operate. For example, the first control device 51 may be configured to cause the alert device 66 to issue an alert when an object exists in the predetermined range from the industrial vehicle 10. The alert by the alert device 66 is issued to alert the operator of the industrial vehicle 10 of an object existing in the predetermined range. In other words, the first control device 51 is configured to perform the object avoidance control in which the alert device 66 issues an alert to notify the operator of the industrial vehicle 10 of an object to urge the operator to avoid the object. The predetermined range may change depending on the vehicle speed of the industrial vehicle 10, or depending on the steering angle. The predetermined range used for the vehicle speed limit and the predetermined range used for the alert may be the same, or different. The alert issued by the alert device 66 includes an alert by the buzzer 67, by the lamp 68, or by both of them. The first control device 51 may switch alert methods, i.e., by the buzzer 67, by the lamp 68, or by both of them depending on a position of the object. The first control device 51 may switch alert methods, i.e., by buzzer 67, by the lamp 68, or by both of them depending on a type of an object.

Vehicle Speed Limit Switching Control

The first control device 51 switches the object detection function ON and OFF depending on the travel mode. In the present embodiment, the first control device 51 performs a vehicle speed limit switching control of switching the vehicle speed limit ON and OFF. When the vehicle speed limit is ON, the vehicle speed of the industrial vehicle 10 is limited according to the detection result of the object detector 61. When the vehicle speed limit is OFF, the vehicle speed of the industrial vehicle 10 is not limited, regardless of the detection result of the object detector 61. The vehicle speed limit switching control is repeatedly performed at a predetermined control cycle.

Figure 9:
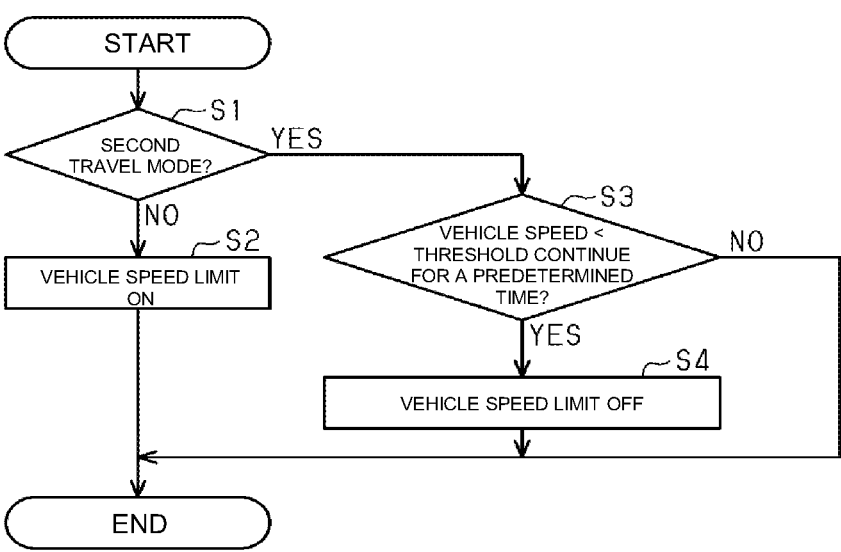
FIG. 9 is a flowchart illustrating a vehicle speed limit switching control performed by a first control device of FIG. 3.

As illustrated in FIG. 9, the first control device 51 determines whether or not the travel mode is the second travel mode at step S1. When it is determined NO at Step S1, the first control device 51 performs a process at Step S2. When it is determined YES at Step S1, the first control device 51 performs a process at Step S3.

At Step S2, since it is determined that the industrial vehicle 10 is movable to the direction including the detection range of the object detector 61, the first control device 51 sets the vehicle speed limit ON. When it is determined NO at Step S1, the first control device 51 sets the first travel mode as the travel mode. Thus, when the first travel mode is set, the first control device 51 performs the vehicle speed limit by setting the upper speed limit according to the detection result of the object detector 61. After completing the process at Step S2, the first control device 51 ends the vehicle speed limit switching control.

At Step S3, the first control device 51 determines whether or not the vehicle speed of the industrial vehicle 10 being less than a threshold continues for a predetermined time or longer. At Step S3, it is determined whether or not the industrial vehicle 10 is stopped. The vehicle speed of the industrial vehicle 10 may be derived by using the rotational speed and the rotational direction of the travel motor 56, the gear ratio, and the outer diameter of the rear wheel 14. The threshold is set at a value at which the industrial vehicle 10 is determined to be stopped. For example, the threshold is set any suitable value from 0 km/h to 3.0 km/h. The predetermined time is set such that the first control device 51 does not mistakenly determine that the industrial vehicle 10 is not stopped in a case where the vehicle speed of the industrial vehicle 10 is at or greater than the threshold due to the disturbance although the vehicle speed is in fact less than the threshold. The predetermined time may be set for any suitable value, for example, from 0.5 seconds to two seconds. When it is determined NO at Step S3, the first control device 51 ends the vehicle speed limit switching control. When it is determined NO at Step S3, switching the vehicle speed limit ON and OFF is not performed. When it is determined NO at Step S3, it may be determined that the industrial vehicle 10 transitions to the second travel mode while travelling in the first travel mode. As a result, even when the industrial vehicle 10 transitions to the second travel mode while travelling in the first travel mode, the upper speed limit is not changed, and the vehicle speed limit is maintained. When it is determined YES at Step S3, the first control device 51 performs a process at Step S4.

At Step S4, the first control device 51 turns the vehicle speed limit OFF. YES at Step S3 indicates that the industrial vehicle 10 transitions to a stopped state at Step S3 after the first travel mode is switched to the second travel mode at Step S1. When the industrial vehicle 10 is stopped after the first travel mode is switched to the second travel mode, the first control device 51 performs a control such that the vehicle speed limit is not performed. When the vehicle speed limit is OFF, the upper speed limit is not set. Changing the upper speed limit includes unsetting the upper speed limit from a state in which the upper speed limit is set. When the vehicle speed limit is OFF, the first control device 51 may set the upper speed limit that does not substantially function as the vehicle speed limit by setting the vehicle speed limit at a value higher than a maximum speed that the industrial vehicle 10 can reach. After completing the process at Step S4, the first control device 51 ends the vehicle speed limit switching control.

Switching of the travel mode from the first travel mode to the second travel mode includes switching of the travel modes by the switching device 71, and the selection switches 86, 87, 88, 89. For example, switching of the travel mode from the first travel mode to the second travel mode includes switching of the travel modes from the normal mode to the parallel travel mode by the switching device 71. For example, switching of the travel mode from the first travel mode to the second travel mode includes switching of the travel mode from the pivot turning mode to the lateral travel mode by the selection switches 86, 87, 88, 89.

Operation of First Embodiment

When the first control device 51 determines that the industrial vehicle 10 transitions to the stopped state after switching the travel mode from the first travel mode to the second travel mode, the first control device 51 sets the vehicle speed limit OFF. The object detector 61 detects an object in the detection range. In the second travel mode, the industrial vehicle 10 do not move toward the detection range. Thus, even the object detector 61 detects an object in the detection range, the industrial vehicle 10 does not move toward the detection range in many cases. The vehicle speed limit is performed to prevent a contact between the industrial vehicle 10 and the object. If the vehicle speed limit is performed in a state that the industrial vehicle 10 does not move toward an object in the detection range, the possibility of contact between the industrial vehicle 10 and the object is low, and which leads to the decrease in the work efficiency. The present embodiment suppresses performing the vehicle speed limit in a situation in which a contact between the industrial vehicle 10 and the object is unlikely to occur by setting the vehicle speed limit OFF when it is determined that the industrial vehicle 10 transitions to the stopped state after switching the travel mode from the first travel mode to the second travel mode. As a result, decrease in the work efficiency may be suppressed.

Effects of First Embodiment (1-1) The first control device 51 does not change the upper speed limit when the first travel mode is switched to the second travel mode while the industrial vehicle 10 is travelling in the first travel mode. As a result, while the vehicle speed limit for the industrial vehicle 10 is performed based on the detection result of the object, the decrease in the work efficiency is suppressed.

(1-2) When the first control device 51 determines that the industrial vehicle transitions to the stopped state after the first travel mode is switched to the second travel mode, the first control device 51 performs a control so as not to perform the vehicle speed limit. It is assumed that the first travel mode is switched to the second travel mode while the industrial vehicle 10 is travelling in the first travel mode. When the vehicle speed limit is performed in the first travel mode, switching to the second travel mode cancels the vehicle speed limit, which may cause the industrial vehicle 10 to accelerate. The acceleration of the industrial vehicle 10 may cause a contact of the industrial vehicle 10 with the object, or load shifting. Not performing the vehicle speed limit on the condition that the industrial vehicle 10 is stopped suppresses the acceleration of the industrial vehicle 10 by switching the travel mode from the first travel mode to the second travel mode.

Second Embodiment

The following will describe a second embodiment of an industrial vehicle. Description of the configurations the same as those of the first embodiment is omitted.

Alert Switching Control

The first control device 51 performs an alert switching control in which an alert is turned ON or OFF. The alert ON indicates that an alert is issued by the alert device 66 according to the detection result of the object detector 61. The alert OFF indicates that the alert is not issued by the alert device 66 regardless of the detection result of the object detector 61. The first control device 51 performs the object avoidance control in which the alert device 61 is controlled according to the detection result of the object detector 61. The alert switching control is repeatedly performed at a predetermined control cycle. The first control device 51 may perform the alert switching control, in addition to the vehicle speed limit switching control. The first control device 51 may perform the alert switching control, instead of the vehicle speed limit switching control.

Figure 10:
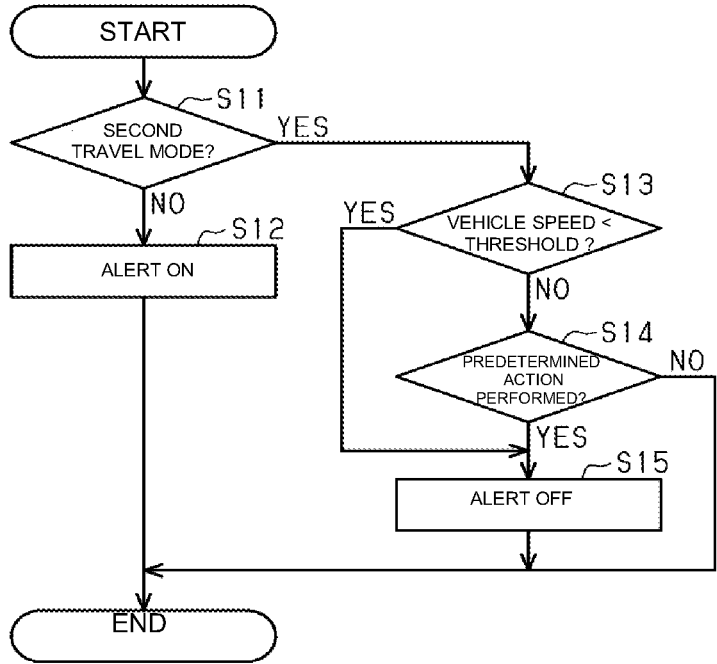
FIG. 10 is a flowchart illustrating an alert switching control performed by the first control device of FIG. 3.

As illustrated in FIG. 10, the first control device 51 determines whether or not the travel mode is the second travel mode at Step S11. When it is determined NO at Step S11, the first control device 51 performs a process at Step S12. When it is determined YES at Step S11, the first control device 51 performs a process at Step S13.

At Step S12, the first control device 51 sets the alert ON. When it is determined NO at Step S11, the first control device 51 sets the first travel mode for the travel mode. Thus, when the first travel mode is set, the first control device 51 allows the alert device 66 to issue an alert according to the detection result of the object detector 61. After completing the process at Step S12, the first control device 51 ends the alert switching control.

At Step S13, the first control device 51 determines whether or not the vehicle speed of the industrial vehicle 10 is less than the threshold. The threshold at Step S13 is the same value of the threshold at Step S3. That is, the threshold at Step S13 is a threshold for determining whether the industrial vehicle 10 travels or is stopped. When the vehicle speed of the industrial vehicle 10 is less than the threshold, the industrial vehicle 10 is stopped. When the vehicle speed of the industrial vehicle 10 is at or greater than the threshold, the industrial vehicle 10 is travelling. When it is determined YES at Step S13, the first control device 51 performs a process at Step S15. When it is determined NO at Step S13, the first control device 51 performs a process at Step S14.

At Step S14, the first control device 51 determines whether or not a predetermined action is performed. The predetermined action is an action that is assumed to be performed by the operator of the industrial vehicle 10 with an intention of stopping the industrial vehicle 10. An example of the predetermined action is decelerating the industrial vehicle 10 such as setting the operation amount of the direction operating member 31 detected by the direction sensor 54 to zero. When it is determined NO at Step S14, the first control device 51 ends the alert switching control. When it is determined NO at Step S14, switching of the alert ON and OFF is not performed. An example of NO at Step S14 is a case where the predetermined action is not performed after the first travel mode is switched to the second travel mode while the industrial vehicle 10 is travelling in the first travel mode. Therefore, if the predetermined action is not performed after the first travel mode is switched to the second travel mode while the industrial vehicle 10 is travelling in the first travel mode, switching of the alert ON and OFF is not performed, and the setting of the alert is not changed. When it is determined YES at Step S14, the first control device 51 performs a process at Step S15.

At Step S15, the first control device 51 sets the alert OFF. YES at Step S14 indicates that the predetermined action is performed at Step S14 after the first travel mode is switched to the second travel mode at Step S11. The first control device 51 performs a control that prevents the alert device 66 from issuing an alert when the predetermined action is performed after the first travel mode is switched to the second travel mode. After completing the process at Step S15, the first control device 51 ends the alert switching control.

Operation of Second Embodiment

The first control device 51 performs a control such that a setting of the alert by the alert device 66 is not changed when the first travel mode is switched to the second travel mode while the industrial vehicle 10 is travelling in the first travel mode. The object detector 61 detects an object in the detection range. In the second travel mode, the industrial vehicle 10 does not move toward the detection range. Thus, even when the object detector 61 detects an object in the detection range, the industrial vehicle 10 does not move toward the detection range in many cases. The alert by the alert device 66 is performed to prevent a contact between the industrial vehicle 10 and the object. If the alert by the alert device 66 is allowed in a state that the industrial vehicle 10 does not move toward an object in the detection range, the possibility of contact between the industrial vehicle 10 and the object is low, and which leads to the decrease in the work efficiency. For example, the operator of the industrial vehicle 10 may decelerate the industrial vehicle 10 if the operator recognizes a risk of a contact between the industrial vehicle 10 and the object by the alert by the alert device 66. The present embodiment suppresses issuing the alert by the alert device 66 in a situation in which a contact between the industrial vehicle 10 and the object is unlikely to occur, by setting the alert OFF when it is determined the predetermined action is performed after switching the travel mode from the first travel mode to the second travel mode.

Effects of Second Embodiment (2-1) The first control device 51 performs a control such that the setting of the alert by the alert device 66 is not changed, when the first travel mode is switched to the second travel mode while the industrial vehicle 10 is travelling in the first travel mode. As a result, while the alert is allowed based on the detection result of the object, the decrease in the work efficiency is suppressed.

(2-2) The first control device 51 performs a control such that the alert by the alert device 66 is not allowed when the predetermined action is performed after the first travel mode is switched to the second travel mode. It is assumed that the first travel mode is switched to the second travel mode while the industrial vehicle is travelling in the first travel mode. If the alert by the alert device 66 is allowed in the first travel mode, switching to the second travel mode stops the alert by the alert device 66, which may cause the operator of the industrial vehicle 10 to recognize mistakenly that there is no risk of a contact between the industrial vehicle and the object. In this case, the operator of the industrial vehicle 10 may continue the travelling of the industrial vehicle 10 although there is a risk of a contact between the industrial vehicle 10 and the object. Deactivating the alert on the condition that the predetermined action is performed may prevent the operator of the industrial vehicle 10 from continuing the travelling of the industrial vehicle 10 in spite of a risk of a contact between the industrial vehicle 10 and the object.

Modified Embodiment

The present embodiment may be modified in various manners, as exemplified below. The above-mentioned embodiments may be combined with the following modifications within a technically consistent range.

In the first embodiment, the first control device 51 may be configured to determine whether or not the operation amount of the direction operating member 31 being zero continues for the predetermined time or longer at Step S3. When it is determined YES at Step S3, the first control device 51 performs the process at Step S4. When it is determined NO at Step S3, the first control device 51 ends the vehicle speed limit switching control.

In the first embodiment, the first control device 51 may be configured to determine whether or not the operation amount of the direction operating member 31 being zero and the vehicle speed of the industrial vehicle 10 being less than the threshold continue for the predetermined time or longer at Step S3.

In the first embodiment, the first control device 51 need not switch the travel mode from the first travel mode to the second travel mode when the first travel mode is switched to the second travel mode while the industrial vehicle 10 is travelling in the first travel mode. In this case, the first travel mode is maintained, and thus a control is performed so as not to change and maintain the upper speed limit in the vehicle speed limit. The first control device 51 may switch the travel mode to the second travel mode when it is determined that the industrial vehicle 10 transitions to the stopped state after the first travel mode is switched to the second travel mode while the industrial vehicle 10 is travelling in the first travel mode.

In the second embodiment, when it is determined NO at Step S13, the first control device 51 may end the alert switching control. That is, the alert switching control need not necessarily include the process of Step S14. In this case, the first control device 51 performs a control such that the setting of the alert by the alert device 66 is not changed when the first travel mode is switched to the second travel mode while the industrial vehicle 10 is travelling in the first travel mode.

In the second embodiment, the first control device 51 need not switch the travel mode from the first travel mode to the second travel mode even though the switching member switch from the first travel mode to the second travel mode while the industrial vehicle 10 is travelling in the first travel mode. In this case, the first travel mode is maintained, and thus a control is performed so as not to change the setting of the alert by the alert device 66. The first control device 51 may switch the travel mode to the second travel mode when it is determined that the predetermined action is performed after the first travel mode is switched to the second travel mode while the industrial vehicle 10 is travelling in the first travel mode.

In the second embodiment, the detector 63 may be a controller. In this case, the detector 63 only needs to be configured not to activate the alert device 66 even if the detector 63 receives an alert command from the first control device 51.

In the embodiments, the display 82 may be used as an alert device. For example, the first control device 51 may alert that an object exists near the industrial vehicle 10 with the display 82.

In the embodiments, a direction in which the detection range of the object detector 61 expands may be changed suitably. For example, a detection range may be a range expanding in front of the industrial vehicle 10. A detection range may be a range expanding in the left-right direction of the industrial vehicle 10. In this case, the second travel mode may be set as the normal mode, the right-angle and sharp turning mode, the pivot turning mode, the lateral travel mode, and the parallel travel mode may be set as the first travel mode.

In the embodiments, the industrial vehicle 10 only needs to include at least one first travel mode and at least one second travel mode. In the present specification, "at least one" means one or more desirable options. In one example, if there are two options, "at least one" used herein means "one of the options" or "both of the two options." In another example, if there are three or more options, "at least one" used herein means "one of the options" or "a combination of any two or more options."

In the embodiments, if the all-way mode is one, the industrial vehicle 10 need not be provided with the selection switches 86, 87, 88, 89.

In the embodiments, the industrial vehicle 10 may be a towing tractor.

In the embodiments, the industrial vehicle 10 may be a counterweight type forklift truck. In this case, in the first embodiment, the first control device 51 may be configured to determine whether or not the operation amount of the accelerator pedal being zero continues for the predetermined time or longer at Step S3. In addition, the first control device 51 may be configured to determine whether or not the operation amount of the accelerator pedal being zero and the vehicle speed of the industrial vehicle 10 being less than the threshold continue for the predetermined time or longer at Step S3. When it is determined YES at Step S3, the first control device 51 performs a process at Step S4. When it is determined NO at Step S3, the first control device 51 ends the vehicle speed limit switching control.

In the embodiments, the object detector 61 may include a distance sensor instead of the stereo camera 62. For the distance sensor, a sensor that can detect coordinates of the object is used. A laser range finder or a millimeter wave radar is used as the distance sensor.

In the embodiments, the alert device 66 may include only one of the buzzer 67 and the lamp 68.

In the embodiments, the industrial vehicle 10 may be autonomous. In this case, the first control device 51 or the second control device 72 may perform switching between the first travel mode and the second travel mode. The first control device 51 and the second control device 72 correspond to the switching member.

What is claimed is:

1. An industrial vehicle comprising:
an object detector;
a switching member configured to perform switching between a first travel mode in which the industrial vehicle travels in a direction toward a detection range of the object detector and a second travel mode in which the industrial vehicle does not travel in the direction toward the detection range of the object detector; and a controller configured to perform an object avoidance control according to a detection result of the object detector, wherein
the controller performs the object avoidance control according to the detection result of the object detector when the first travel mode is set, and
the controller performs a control so as to maintain the object avoidance control when the first travel mode is switched to the second travel mode while the industrial vehicle is travelling in the first travel mode, wherein
the first travel mode includes a state in which a front wheel of the industrial vehicle is oriented in a front-rear direction of the industrial vehicle when the industrial vehicle travels straight, and
the second travel mode includes at least one of (i) a lateral travel mode that is a state in which the front wheel is oriented in a left-right direction of the industrial vehicle when the industrial vehicle travels straight, and (ii) a parallel travel mode that is a state in which the front wheel of the industrial vehicle and a rear wheel of the industrial vehicle are oriented in a same direction.

2. The industrial vehicle according to claim 1, wherein
the object avoidance control includes a vehicle speed limit by setting an upper speed limit.

3. The industrial vehicle according to claim 2, wherein
the controller performs a control such that the upper speed limit is changed when the industrial vehicle transitions to a stopped state after the first travel mode is switched to the second travel mode while the industrial vehicle is travelling in the first travel mode.

4. The industrial vehicle according to claim 1, further comprising:
an alert device,
the object avoidance control includes a control in which the alert device is controlled according to the detection result of the object detector, and
the controller performs a control that prevents the alert device from issuing an alert when a predetermined action is performed after the first travel mode is switched to the second travel mode while the industrial vehicle is travelling in the first travel mode.

* * * * *